United States Patent
Jeong et al.

(10) Patent No.: US 9,760,181 B2
(45) Date of Patent: Sep. 12, 2017

(54) APPARATUS AND METHOD FOR RECOGNIZING GESTURE USING SENSOR

(71) Applicant: Samsung Electronics Co., Ltd., Suwon-si, Gyeonggi-do (KR)

(72) Inventors: Moonsik Jeong, Seongnam-si (KR); Seongoh Lee, Yongin-si (KR); Sungdo Choi, Suwon-si (KR); Hyeonhee Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 14/564,762

(22) Filed: Dec. 9, 2014

(65) Prior Publication Data

US 2015/0160737 A1  Jun. 11, 2015

(30) Foreign Application Priority Data

Dec. 11, 2013 (KR) .................. 10-2013-0153692

(51) Int. Cl.
*G06F 3/01* (2006.01)
*G06K 9/00* (2006.01)

(52) U.S. Cl.
CPC ......... *G06F 3/017* (2013.01); *G06K 9/00355* (2013.01); *G06F 2203/04101* (2013.01)

(58) Field of Classification Search
CPC ... G06F 3/017; G06F 2203/04101; G06F 3/01
See application file for complete search history.

(56) References Cited

U.S. PATENT DOCUMENTS

| | | | | |
|---|---|---|---|---|
| 2008/0266083 | A1* | 10/2008 | Midholt | G06F 3/017 340/540 |
| 2010/0188328 | A1* | 7/2010 | Dodge | G06F 3/0346 345/156 |
| 2010/0300771 | A1* | 12/2010 | Miyazaki | G06F 3/0488 178/18.03 |
| 2011/0018795 | A1* | 1/2011 | Jang | G06F 3/0304 345/156 |
| 2011/0267264 | A1* | 11/2011 | McCarthy | G06F 3/017 345/157 |
| 2013/0009875 | A1* | 1/2013 | Fry | G06F 3/0304 345/168 |
| 2013/0120120 | A1* | 5/2013 | Long | G06K 7/01 340/10.5 |
| 2013/0215027 | A1* | 8/2013 | Van Lydegraf | G06F 3/017 345/158 |
| 2013/0271618 | A1 | 10/2013 | Koryakovskiy et al. | |
| 2015/0084930 | A1* | 3/2015 | Watanabe | G06F 3/0425 345/175 |
| 2016/0026255 | A1* | 1/2016 | Katz | G06K 9/00201 345/156 |

FOREIGN PATENT DOCUMENTS

KR   10-2013-0116013 A   10/2013

* cited by examiner

*Primary Examiner* — Md Saiful A Siddiqui
(74) *Attorney, Agent, or Firm* — Jefferson IP Law, LLP

(57) ABSTRACT

A method for recognizing a gesture by using a sensor is provided. The method includes recognizing sensor values for an object uninterruptedly in a plurality of sensors having a different operational range, generating a control value by combining the sensor values, and executing a function corresponding to the control value.

16 Claims, 15 Drawing Sheets

APPARATUS AND METHOD FOR RECOGNIZING GESTURE USING SENSOR

CROSS-REFERENCE TO RELATED APPLICATION(S)

This application claims the benefit under 35 U.S.C. §119(a) of Korean patent application filed on Dec. 11, 2013 in the Korean Intellectual Property Office and assigned Serial number 10-2013-0153692, the entire disclosure of which is hereby incorporated by reference.

TECHNICAL FIELD

The present disclosure relates to a method for recognizing a gesture of a user by using a sensor.

BACKGROUND

In general, a method of detecting a gesture of a user in a portable terminal uses a method for recognizing up, down, left, and right gestures or detecting a specific gesture by using a camera. Among them, a hand gesture recognition technology means a technology of recognizing a gesture related to a hand such as a movement of the hand, a form of the hand, and the like by using various sensors. A hand gesture recognition method of the related art may recognize a hand gesture by using various sensors such as a contact sensor, a proximity sensor, and a camera sensor, and the like.

Since a gesture recognition method of the related art recognizes a gesture by using various sensors, in some cases, the gesture recognition method may not recognize a gesture of an object when a distance to the object changes. Because each sensor has a different operational range or feature, when the object goes beyond the operational range of a first sensor, a second sensor may recognize the gesture of the object in place of the first sensor. However, the gesture of the object may not be recognized uninterruptedly between the operational ranges of two sensors. That is, in the gesture recognition method of the related art, the second sensor may not recognize uninterruptedly the gesture of the object in place of the first sensor when the first sensor may not recognize the gesture of the object any more.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for recognizing a gesture by using a sensor that can recognize uninterruptedly a gesture of an object in a plurality of sensors having a different operational range.

In accordance with an aspect of the present disclosure, a method for recognizing a gesture by using a sensor is provided. The method includes recognizing sensor values for an object uninterruptedly in a plurality of sensors having a different operational range, generating a control value by combining the sensor values, and executing a function corresponding to the control value.

In accordance with another aspect of the present disclosure, an apparatus for recognizing a gesture by using a sensor is provided. The apparatus includes a sensor unit configured to recognize sensor values for an object uninterruptedly and a controller configured to generate a control value by combining the sensor values and to execute a function corresponding to the control value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
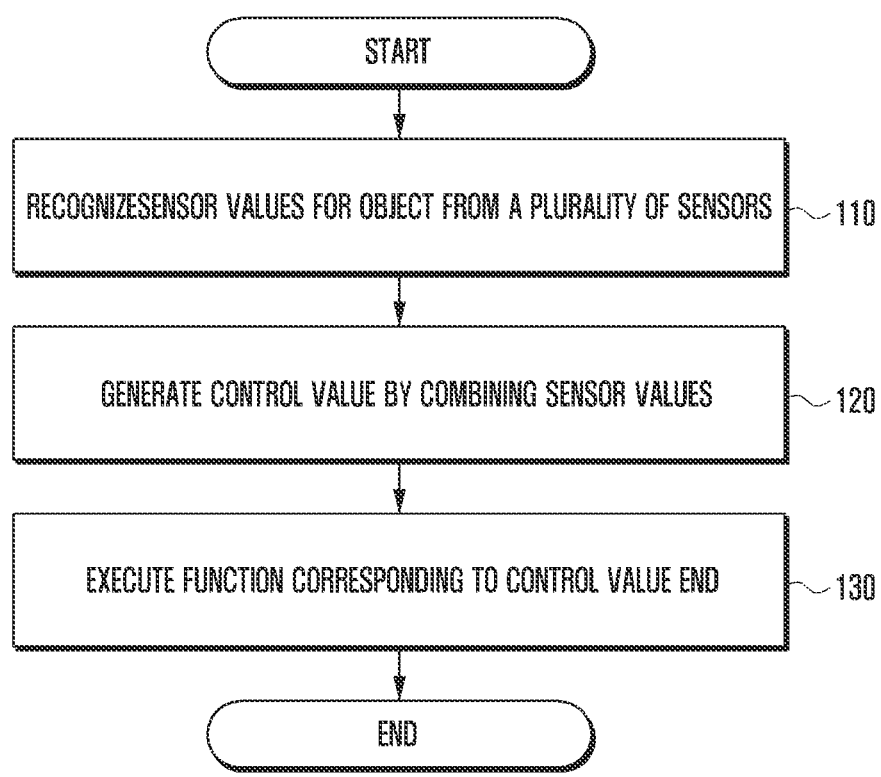
FIG. 1 is a flowchart illustrating a method for recognizing a gesture by using a sensor according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarify and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A gesture recognition apparatus by using a sensor according to the present disclosure may be included and performed in an "electronic device".

The electronic device according to the present disclosure may be a device that includes a communication function.

For example, the electronic device may include at least one of a smart phone, a tablet personal computer, a mobile phone, a video phone, an e-book reader, a desktop personal computer, a laptop personal computer, a netbook computer, a personal digital assistant (PDA), a portable multimedia player (PMP), an MP3 player, a mobile medical device, a camera, or a wearable device (e.g., a head-mounted-device (HMD) like an electronic glasses, an electronic clothe, an electronic bracelet, an electronic necklace, an electronic appcessory, an electronic tattoo, or a smart watch).

According to various embodiments of the present disclosure, the electronic device may be a smart home appliance equipped with a communication function. The smart home appliance may include, for example, at least one of a television, a digital video disk (DVD) player, an audio system, a refrigerator, an air conditioner, a vacuum cleaner, an oven, a microwave, a washing machine, an air cleaner, a set-top box, a TV box (e.g., Samsung HomeSync™, apple TV™, or Google TV™), game consoles, an electronic dictionary, an electronic key, a camcorder, or a digital photo frame.

According to various embodiments of the present disclosure, the electronic device may include at least one of various medical devices (e.g., a magnetic resonance angiography (MRA), a magnetic resonance imaging (MRI), a computed tomography (CT), a camera, and a ultrasonic machine, etc.), a navigation device, a global positioning system (GPS) receiver, an event data recorder (EDR), a flight data recorder (FDR), an automotive infotainment device, a marine electronic equipment (e.g., a marine navigation equipment and a gyro compass, etc.), avionics, a security device, or an industrial or a home robot.

According to various embodiments of the present disclosure, the electronic device may include at least one of furniture or part of building/structure including a communication function, an electronic board, an electronic signature receiving device, a projector, or various measurement devices (e.g., a water, electricity, gas, or radio wave measurement equipment, etc.). The electronic device according to the present disclosure may be one of the above-mentioned various devices or a combination thereof. Further, it is apparent to those skilled in the art that the electronic device according to the present disclosure is not limited to the above-mentioned devices.

FIG. 1 is a flowchart illustrating a method for recognizing a gesture by using a sensor according to an embodiment of the present disclosure. "A method for recognizing a gesture by using a sensor" of the present disclosure may be performed by an apparatus for recognizing a gesture by using a sensor.

Referring to FIG. 1, at operation 110, the apparatus (hereinafter, referred to as "the gesture recognition apparatus") for recognizing a gesture by using a sensor uninterruptedly recognizes sensor values for an object from a plurality of sensors having a different operational range. Here, the object is a "target" that the gesture recognition apparatus recognizes, and may be, for example, user's hand.

In the related art, a gesture may be recognized by using a plurality of sensors. Thus, if a distance from the object is changed, in some cases, the gesture of the object may not be recognized uninterruptedly because each sensor has a different operational range or feature. That is, if the object goes beyond the operational range of a first sensor, a second sensor should recognize the gesture of the object in place of the first sensor. However, in the related art, the first sensor and the second sensor may not recognize the gesture of the object uninterruptedly.

Accordingly, the present disclosure may seamlessly recognize the gesture of the object subsequently by a plurality of sensors.

According to an embodiment of the present disclosure, the gesture recognition apparatus may use at least one of a contact sensor, a proximity sensor, a camera sensor, and a dynamic vision sensor as sensors recognizing sensor values for the object. The plurality of sensors may have a different operational range or feature.

TABLE 1

| Sensor type | Distance | Fps | Power | Resolution | XY | Z | Luminance |
| --- | --- | --- | --- | --- | --- | --- | --- |
| Proximity sensor | 0~150 | — | Low (≤5) | — | Hw | Hw | High |
| Dynamic vision sensor | 0~300 | High (≥120) | Low (≤10) | 120 × 120 | SW | SW | — |
| Camera sensor | 0~500 | 30 | High (≥100) | ≥QVGA | SW | SW | Low (≥20) |

Figure 2:
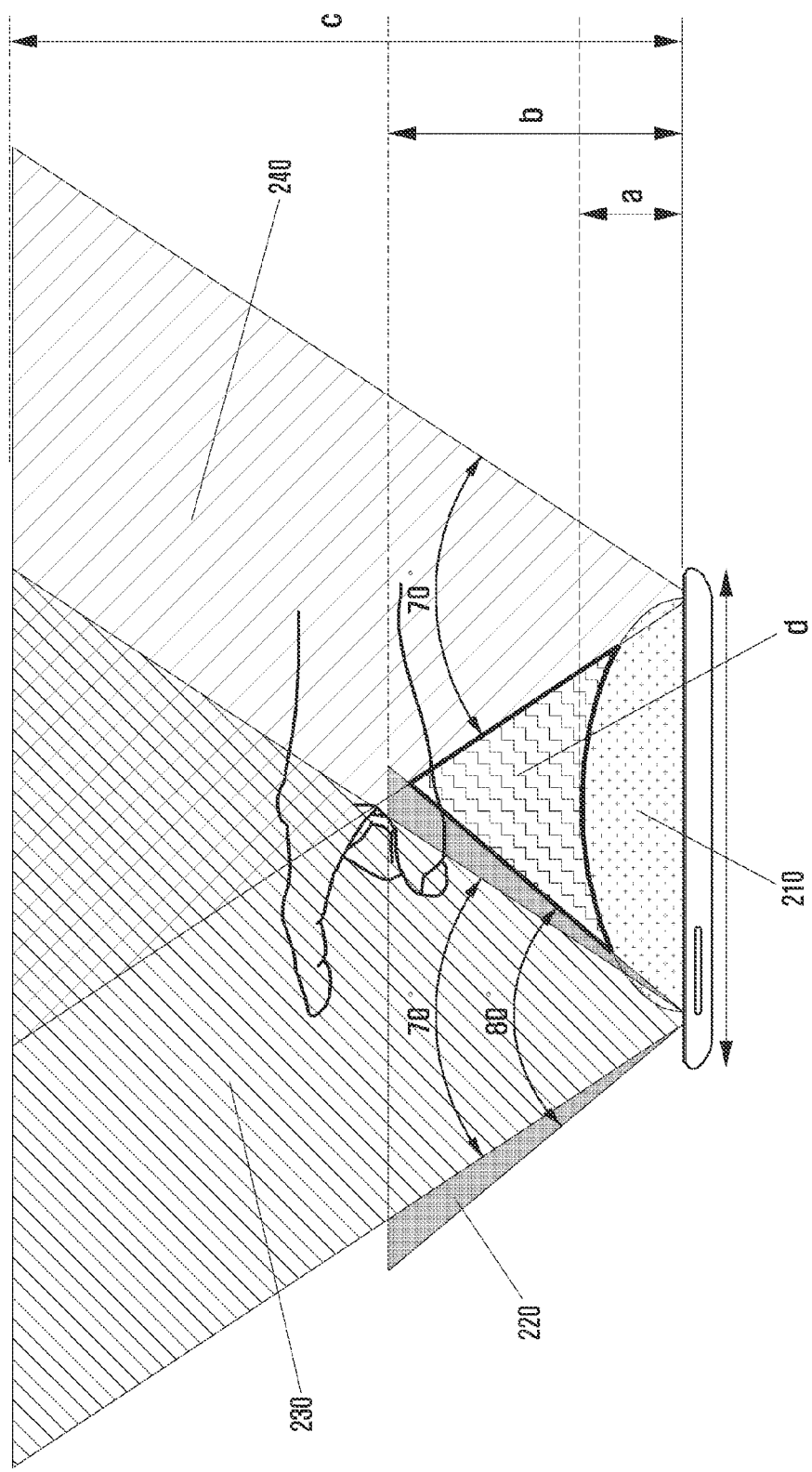
FIG. 2 is a diagram illustrating an operational range of a plurality of sensors according to an embodiment of the present disclosure.

FIG. 2 is a diagram illustrating an operational range of a plurality of sensors according to an embodiment of the present disclosure.

Referring to FIG. 2 and Table 1, the sensors may be listed based on an operational distance (mm) That is, in case of a contact sensor 210, a distance (or a vertical distance) to the object from one side of the gesture recognition apparatus is '0~50(a)'. In case of a proximity sensor 220, the distance is '0~150(b)', in case of a dynamic vision sensor 240, the distance is '0~300(c)', and, in case of a camera sensor 230, the distance is '0~500'. However, an operational angle (80°) of the proximity sensor 220 is larger than the operational angle (70°) of the camera sensor 230 and the operational angle (70°) of the dynamic vision sensor 240.

In addition, the frame per second (Fps) of the dynamic vision sensor 240 is higher than that of the camera sensor 230. The proximity sensor 220 has the lowest operational power (mW), whereas the camera sensor 230 has the highest operational power. The resolution of the camera sensor 230 is higher than that of the dynamic vision sensor 240. For reference, the resolution of quarter video graphics array (QVGA) is 320×240. The proximity sensor 220 has a high luminance (Lux), and the luminance of the camera sensor 230 is 20 or less.

That is, the plurality of sensors has a different operational range or feature. Thus, the plurality of sensors may output a sensor value as a data level, a feature level, and a decision level, depending on a level of data. Therefore, the gesture recognition apparatus may generate a single overall control value by using the data level, the feature level, and the decision level output from each sensor. Therefore, the gesture recognition apparatus may implement a gesture recognition technology which is not limited to the operational range or feature of each sensor.

According to an embodiment of the present disclosure, the plurality of sensors may recognize at least one of a depth value, a pointer value, or a swipe value as the sensor value.

Figure 3:
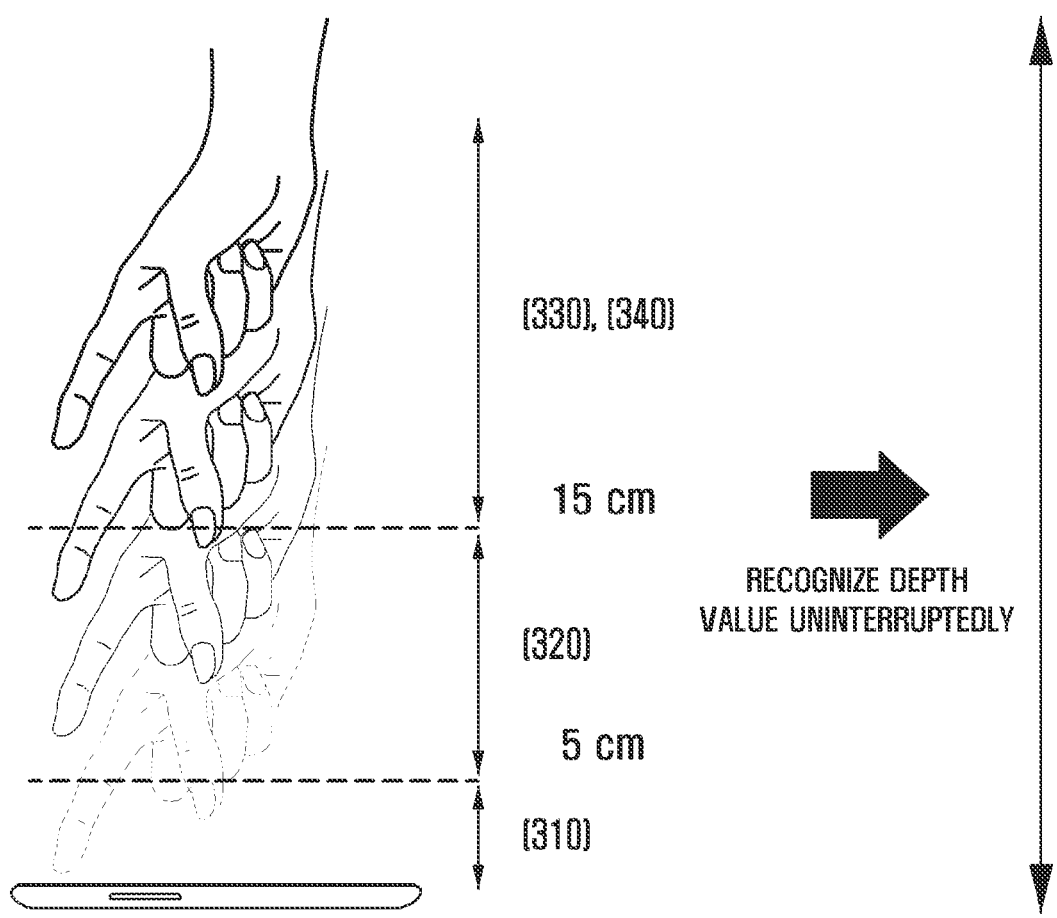
FIG. 3 is a diagram illustrating an example of recognizing a depth value according to an embodiment of the present disclosure.

FIG. 3 is a diagram illustrating an example of recognizing a depth value according to an embodiment of the present disclosure.

Referring to FIG. 3, the gesture recognition apparatus may recognize the distance from a surface (screen) of the gesture recognition apparatus as a depth value through an operation of unidirectionally pushing and pulling the one surface. A contact sensor 310 may recognize the distance as far as 50 mm, and a proximity sensor 320 may recognize the distance as far as 150 mm, and a camera sensor 330 and a dynamic vision sensor 340 may recognize the distance as far as 300 mm. Thus, even if the distance of the object is changed from 0 to 300, the gesture recognition apparatus may recognize uninterruptedly the depth value of the object through the contact sensor 310, the proximity sensor 320, the camera sensor 330, and the dynamic vision sensor 340. The gesture recognition apparatus may perform a function corresponding to the depth value.

Figure 4A:
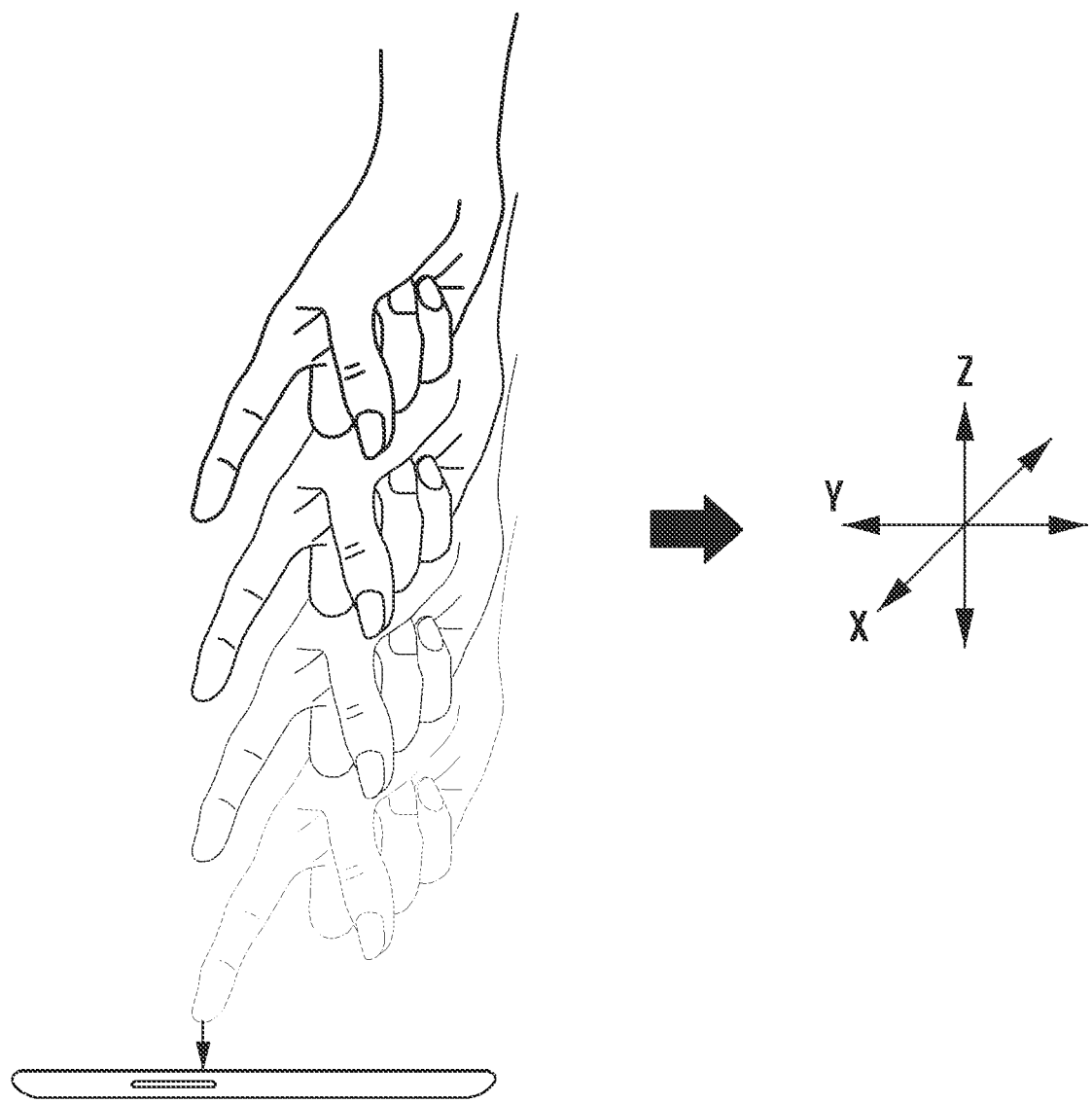
FIGS. 4A, 4B, and 4C are diagrams illustrating an example of recognizing a pointer value according to an embodiment of the present disclosure.
Figure 4B:
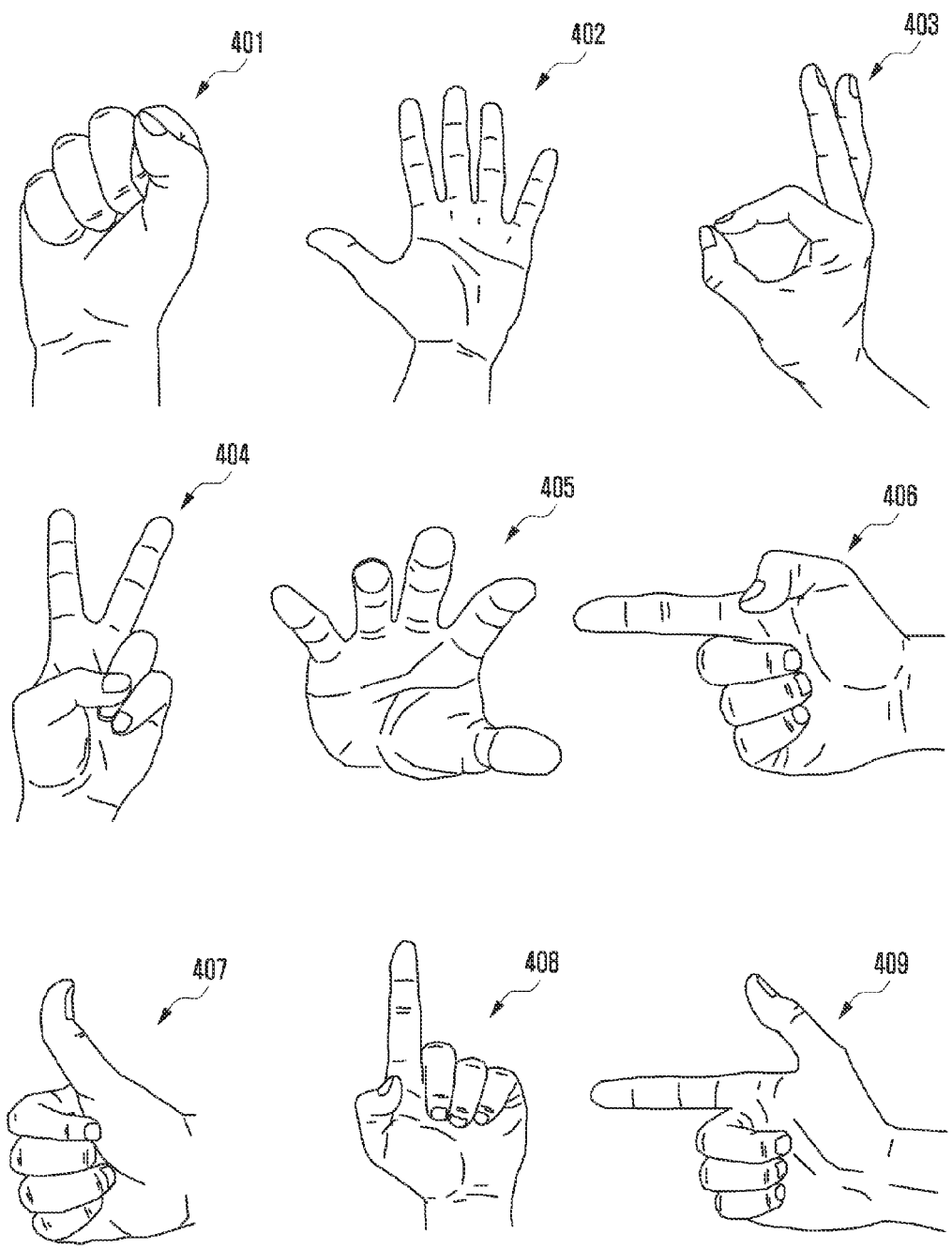
Figure 4C:
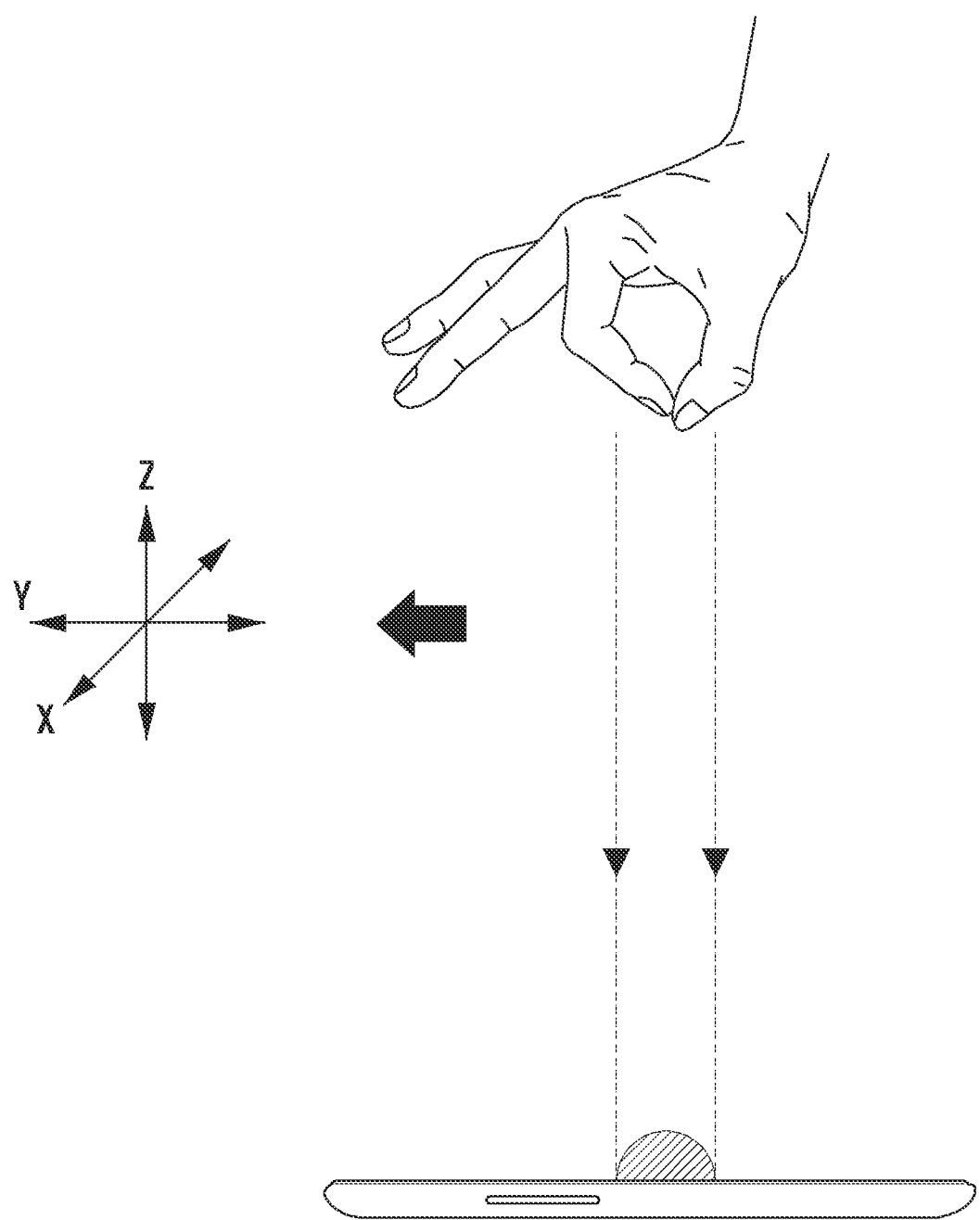

FIGS. 4A to 4C are diagrams illustrating an example of recognizing a pointer value according to an embodiment of the present disclosure.

Referring to FIG. 4A, the gesture recognition apparatus may recognize a pointer value as the sensor value by using the object as a spatial pointer. For example, the pointer value may include x, y, z coordinate values in space. That is, the plurality of sensors (contact sensor, proximity sensor, camera sensor, dynamic vision sensor) that may recognize the pointer value have a different operational range. However, the plurality of sensors may uninterruptedly recognize the pointer value for the object.

Referring to FIG. 4B, the gesture recognition apparatus may recognize a symbol as the pointer value. For example, the symbol may include a fist 401, a palm 402, a OK 403, a peace-sign 404, a fingers spread 405, an index finger side pointing 406, a thumb up 407, an index finger up pointing 408, and an index finger side pointing and thumb up 409, and the like.

Referring to FIG. 4C, the gesture recognition apparatus may perform a function corresponding to the symbol. For example, when the symbol is OK, the gesture recognition apparatus may give a function of "magnification", so that the screen of the gesture recognition apparatus may be magnified or reduced.

Figure 5:
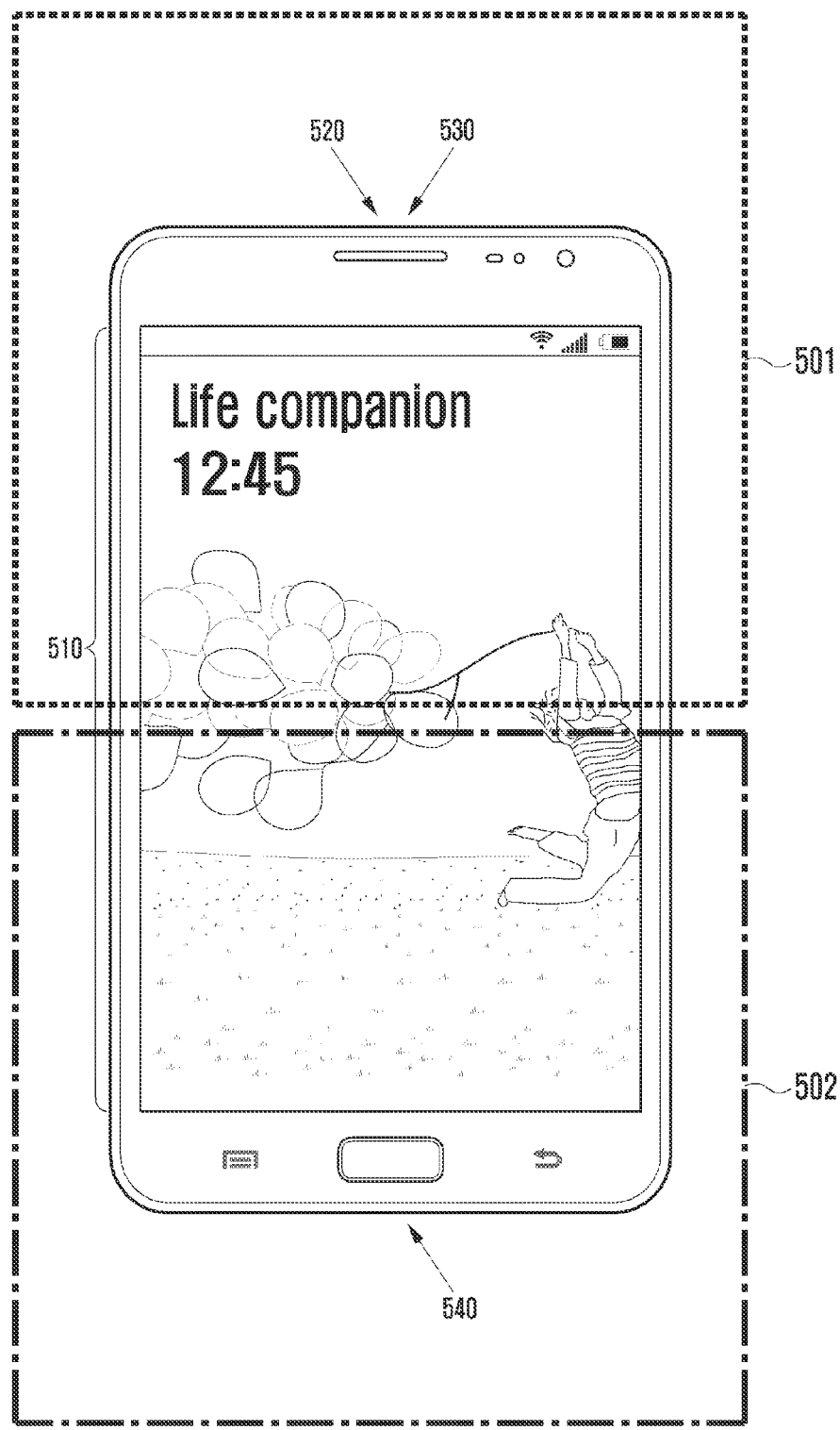
FIG. 5 is a diagram illustrating an example of tracking an object according to an embodiment of the present disclosure.

FIG. 5 is a diagram illustrating an example of tracking an object according to an embodiment of the present disclosure.

Referring to FIG. 5, the gesture recognition apparatus may determine a mounting position of at least one of the contact sensor, the proximity sensor, the camera sensor, or the dynamic vision sensor in consideration of the operational range of the sensor. For example, when the gesture recognition apparatus is a "smart phone", if the screen is equipped with a contact sensor 510, and a proximity sensor 520 and a camera sensor 530 are mounted in an upper portion of the screen, a dynamic vision sensor may be mounted in a lower portion of the screen.

After each sensor is mounted as mentioned above, the gesture recognition apparatus may track the object by using the sensor value in consideration of the operational range or the feature of each sensor. For example, since the proximity sensor 520 and the camera sensor 530 may easily recognize the pointer value, the gesture recognition apparatus may track the object based on the pointer value (501). Alternatively, since a dynamic vision sensor 540 mounted in the lower portion of the screen may easily recognize the motion of object, the gesture recognition apparatus may track the object based on a motion value (502). In this case, the motion value may be interpreted as a swipe value.

Thus, the gesture recognition apparatus may recognize a gesture of the object by tracking the gesture of the object even in an area d of FIG. 2 that the contact sensor 510, the proximity sensor 520, the camera sensor 530, and the dynamic vision sensor 540 may not recognize.

Figure 6:
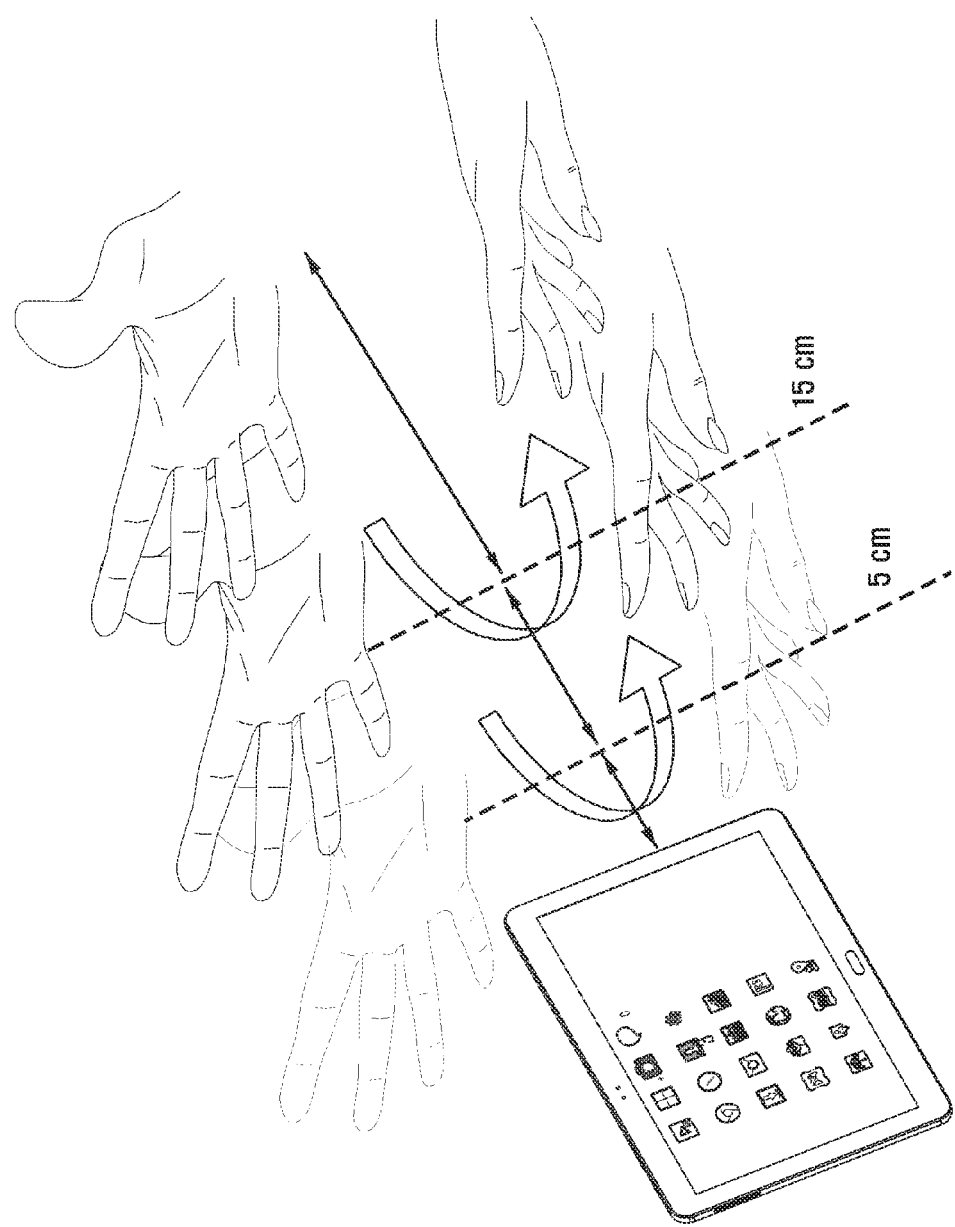
FIG. 6 is a diagram illustrating an example of recognizing a swipe value according to an embodiment of the present disclosure.

FIG. 6 is a diagram illustrating an example of recognizing a swipe value according to an embodiment of the present disclosure.

Referring to FIG. 6, the gesture recognition apparatus may recognize a swipe value by using the sensor value, by utilizing a hand-swipe recognition technology which is a hand gesture recognition technology. The swipe value is a sensor value having a depth value or a pointer value of the object, which is changed according to a time. Accordingly, the gesture recognition apparatus may recognize the swipe value for a certain time according to a motion of the object or a speed of the object. In this case, although the depth value of the object is changed, the plurality of sensors may recognize the motion of the object uninterruptedly. Therefore, the gesture recognition apparatus may recognize the motion of the object without an interruption, regardless of the limit of operational range of each sensor.

At operation 120 of FIG. 1, the gesture recognition apparatus may generate a control value by combining the sensor values. That is, the sensor values recognized in the plurality of sensors may be identical or different. Therefore, the gesture recognition apparatus may generate a control value by combining the same type of sensor value or different types of sensor values.

According to an embodiment of the present disclosure, the gesture recognition apparatus may generate a control value by combining an absolute value of each sensor value or a relative value of each sensor value in consideration of the operational range of each sensor, when the types of the sensor values are identical. For example, the sensor value recognized in the contact sensor and the proximity sensor may have an absolute value, and the sensor value recognized in the camera sensor and the dynamic vision sensor may have a relative value.

According to another embodiment of the present disclosure, the gesture recognition apparatus may generate a control value by updating the sensor values, and combining the updated sensor values, when the types of the sensor values are different.

According to another embodiment of the present disclosure, the gesture recognition apparatus may generate a first combination value by combining the absolute value of each sensor or the relative value of each sensor in consideration of the operational range of each sensor, with respect to the same type of sensor values. Further, the gesture recognition apparatus may generate a second combination value by updating the sensor values and combining the updated sensor values, with respect to the different type of sensor values, and may generate a control value by combining the first combination value and the second combination value.

At operation 130, the gesture recognition apparatus may execute a function corresponding to the control value.

Figure 7A:
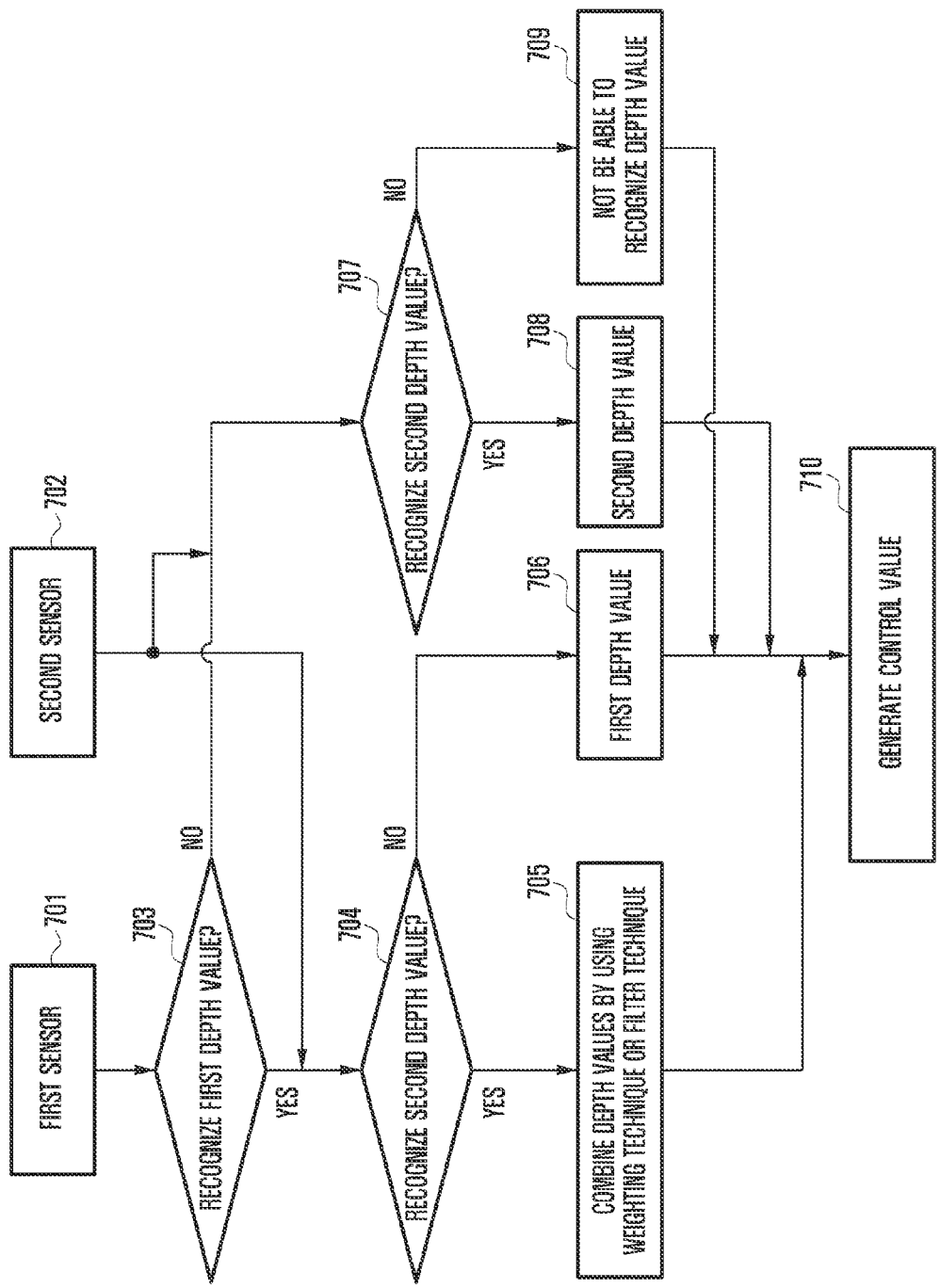
FIGS. 7A and 7B are diagrams illustrating an example of generating a control value by combining the same type of sensor values according to an embodiment of the present disclosure.
Figure 7B:
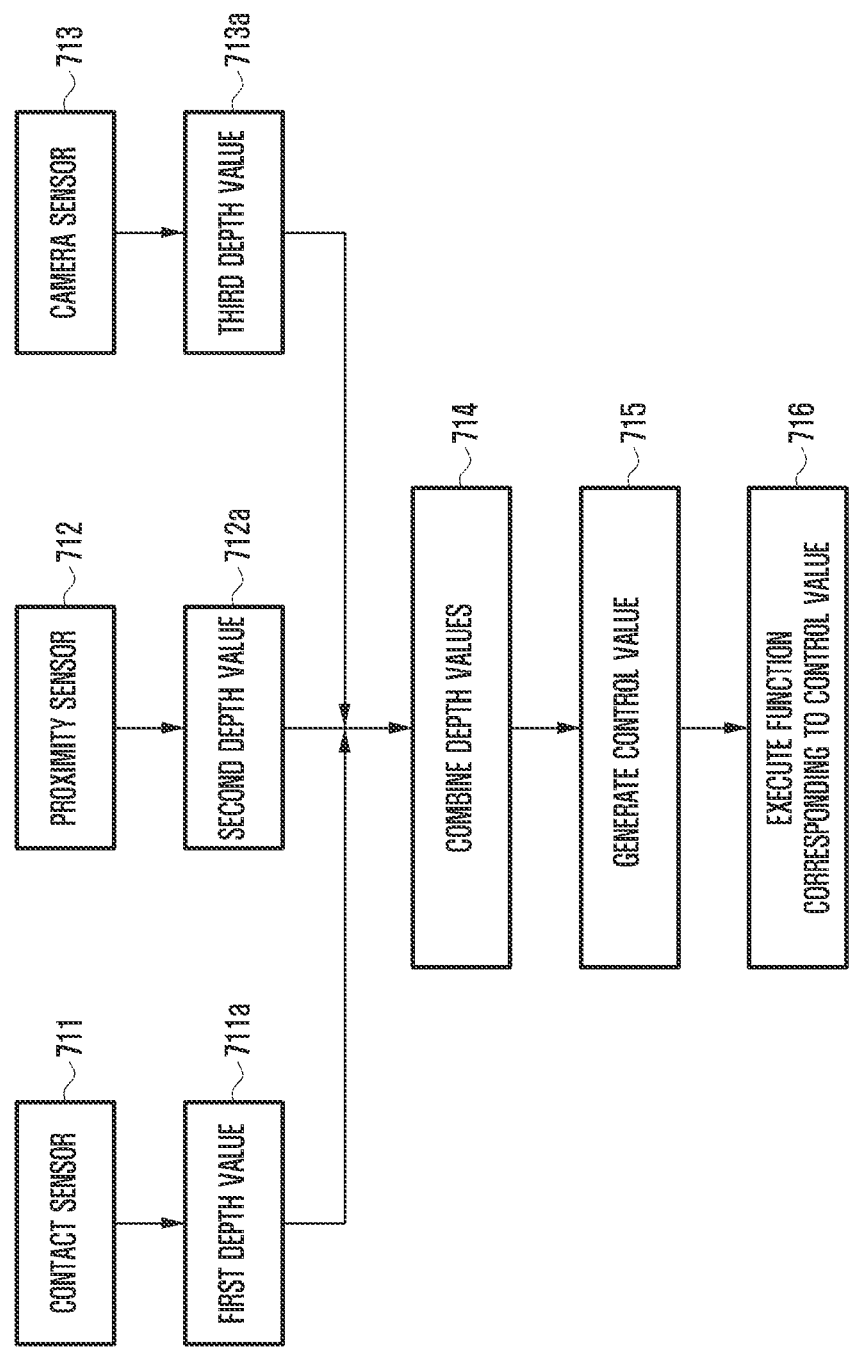

FIGS. 7A and 7B are diagrams illustrating an example of generating a control value by combining the same type of sensor values according to an embodiment of the present disclosure.

Referring to FIG. 7A, for the convenience of description, the depth value recognized by a first sensor 701 is referred to as a first depth value, and the depth value recognized by a second sensor 702 is referred to as a second depth value.

At operation 703, the gesture recognition apparatus may determine whether the first sensor 701 recognizes the first depth value. When the first depth value is recognized, at operation 704, the gesture recognition apparatus may determine whether the second sensor 702 recognizes the second depth value. At operation 705, the gesture recognition apparatus may combine the first depth value and the second depth value by using a weighting technique or a filter technique. As an example, after applying weighting of the first sensor to the first depth value, and applying weighting of the second sensor to the second depth value, the gesture recognition apparatus may divide a sum of two depth values to which weightings are applied by a sum of weightings.

At operation 710, the gesture recognition apparatus may generate a control value by using an output value of operation 705 as the control value.

Alternatively, when the second sensor 702 does not recognize the second depth value, at operation 706 and operation 710, the gesture recognition apparatus may generate a control value by only the first depth value.

Alternatively, when the first sensor 701 does not recognize the first depth value, at operation 707, the gesture recognition apparatus may determine whether the second sensor 702 recognizes the second depth value. At operation 708 and operation 710, the gesture recognition apparatus may generate a control value by only the second depth value.

Alternatively, at operation 709, the gesture recognition apparatus may not be able to recognize both the first depth value and the second depth value.

Referring to FIG. 7B, at operation 711a, the gesture recognition apparatus may recognize the first depth value by using a contact sensor 711. At operation 712a, the gesture recognition apparatus may recognize the second depth value by using a proximity sensor 712. At operation 713a, the gesture recognition apparatus may recognize a third depth value by using a camera sensor 713. For reference, the depth value recognized by the contact sensor 711 and the proximity sensor 712 may have an absolute value, and the depth value recognized by the camera sensor 713 and the dynamic vision sensor may have a relative value.

At operation 714, the gesture recognition apparatus may combine the first depth value to the third depth value. For example, the gesture recognition apparatus may combine the absolute values of the first depth value and the second depth value by using a weighting technique or a filter technique, may map the absolute value of the second depth value to the relative value of the third depth value, and may map the absolute value of the first depth value to the relative value of the third depth value.

At operation 715, the gesture recognition apparatus may generate a control value by using the combined depth values.

At operation 716, the gesture recognition apparatus may execute a function corresponding to the control value. The gesture recognition apparatus may previously set a function corresponding to the control value, and may store a function for each control value in the storage unit (not shown). For example, the gesture recognition apparatus may set "DMB" for the first control value, set "screen magnification" for the second control value, and set "screen reduction" for the third control value.

Figure 8A:
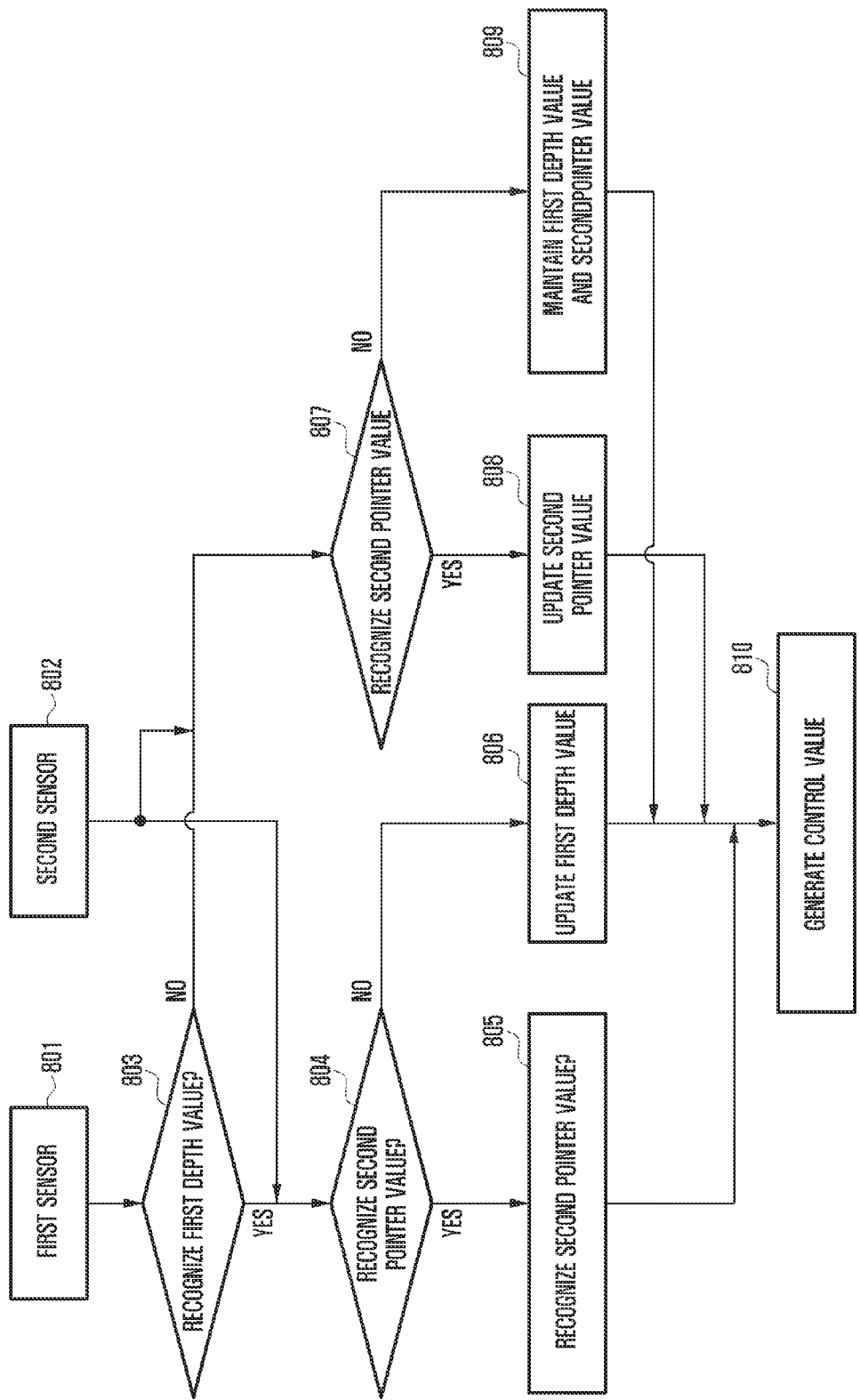
FIGS. 8A and 8B are diagrams illustrating an example of generating a control value by combining a different type of sensor values according to an embodiment of the present disclosure.
Figure 8B:
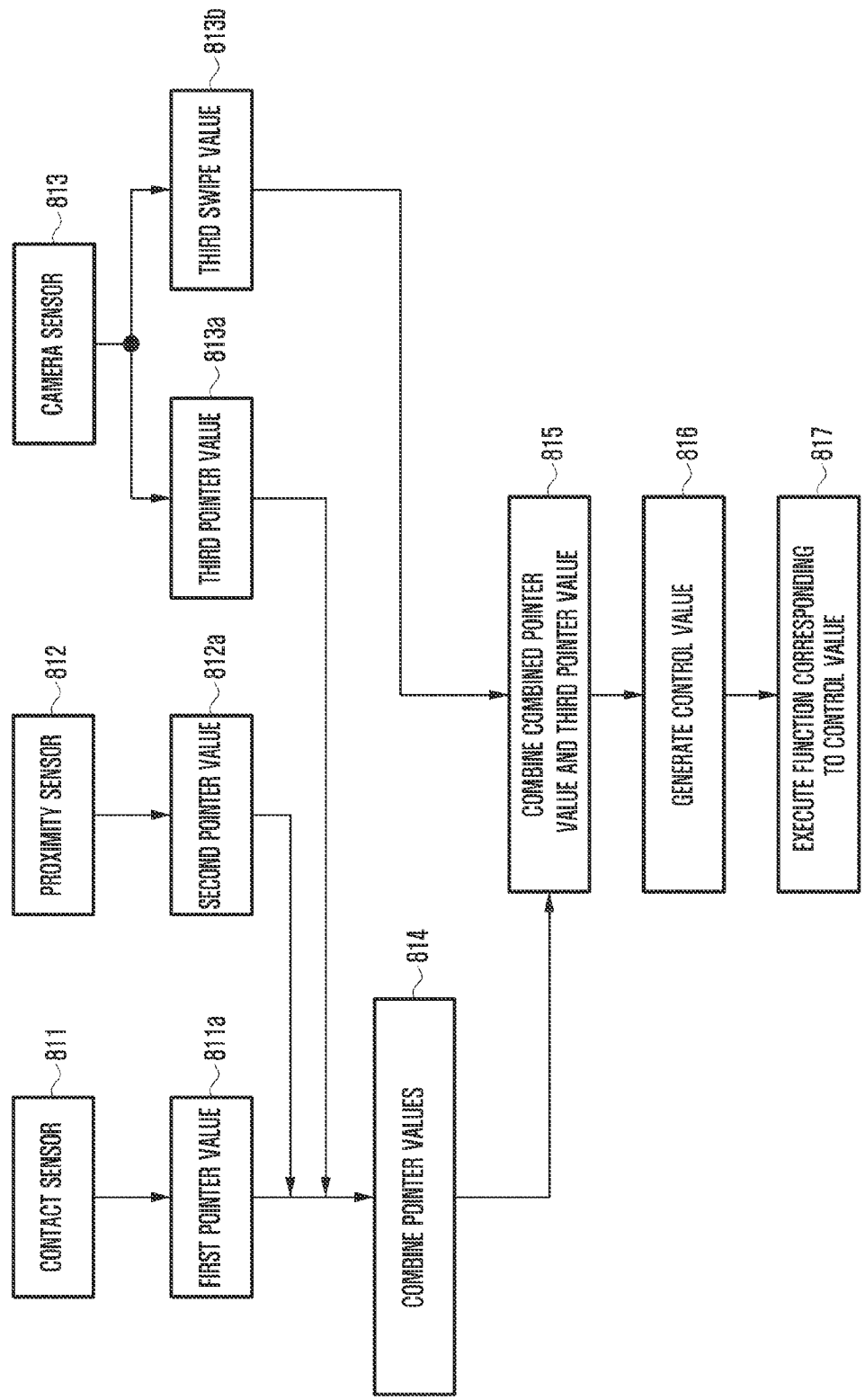

FIGS. 8A and 8B are diagrams illustrating an example of generating a control value by combining a different type of sensor values according to an embodiment of the present disclosure.

Referring to FIG. 8A, at operation 803, the gesture recognition apparatus may determine whether a first sensor 801 recognizes the first depth value. When the first depth value is recognized, at operation 804, the gesture recognition apparatus may determine whether a second sensor 802 recognizes a second pointer value. At operation 805, the gesture recognition apparatus may update the first depth value and the second pointer value. For example, the gesture recognition apparatus may determine whether the first depth value or the second pointer value is changed.

At operation 810, the gesture recognition apparatus may generate a control value by using an output of operation 805 as the control value.

Alternatively, when the second sensor 802 does not recognize the second pointer value, at operation 806, the gesture recognition apparatus may update the first depth value. At operation 810, the gesture recognition apparatus may generate a control value by only the first depth value.

Alternatively, when the first sensor 801 does not recognize the first depth value, at operation 807, the gesture recognition apparatus may determine whether the second sensor 802 recognizes the second pointer value. At operation 808, the gesture recognition apparatus may update the second pointer value. In this case, at operation 810, the gesture recognition apparatus may generate a control value by only the second pointer value.

Alternatively, when the first sensor 801 does not recognize the first depth value, and the second sensor 802 does not recognize the second pointer value, at operation 809, the gesture recognition apparatus may maintain a previous first depth value and a previous second pointer value. At operation 810, the gesture recognition apparatus may generate a control value by combining the previous first depth value and the previous second pointer value. For reference, the previous first depth value means a depth value, which is recognized earlier than the first depth value.

Referring to FIG. 8B, at operation 811a, the gesture recognition apparatus may recognize the first pointer value by using a contact sensor 811. At operation 812a, the gesture recognition apparatus may recognize the second pointer value by using a proximity sensor 812. At operation 813a and operation 813b, the gesture recognition apparatus may recognize the third pointer value and the third swipe value by using a camera sensor 813. For reference, the pointer value recognized by the contact sensor 811 and the proximity sensor 812 has an absolute pointer, and the pointer value recognized by the camera sensor 813 and the dynamic visual sensor may have a relative value.

At operation 814, the gesture recognition apparatus may generate a first combination value by combining the first pointer value to the third pointer value. For example, the gesture recognition apparatus may combine the absolute values of the first pointer value and the second pointer value by using a weighting technique or a filter technique, may map the absolute value of the second pointer value to the relative value of the third pointer value, and may map the absolute value of the first pointer value to the relative value of the third pointer value, so that the first combination value may be generated.

At operation 815, the gesture recognition apparatus may generate a second combination value by combining the first combination value (combined pointer value) and the third swipe value. In this case, the gesture recognition apparatus may update the first combination value, update the third swipe value, and may generate a second combination value by combining the updated second combination value and the updated third swipe value.

At operation 816, the gesture recognition apparatus may generate a control value by using the second combination value.

At operation 817, the gesture recognition apparatus may execute a function corresponding to the control value.

Figure 9A:
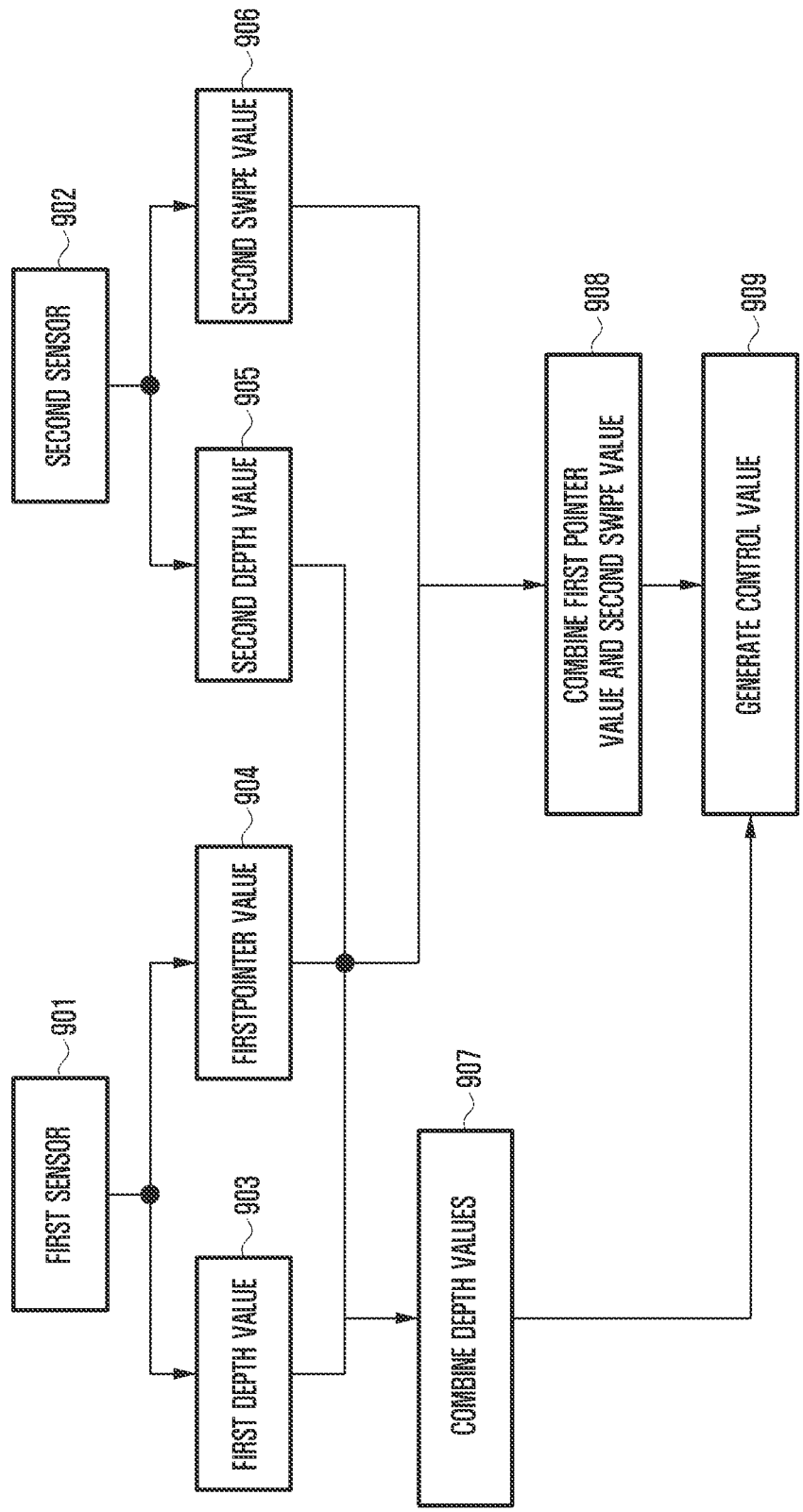
FIGS. 9A and 9B are diagrams illustrating an example of generating a control value by combining the same type of sensor values and a different type of sensor values according to an embodiment of the present disclosure.
Figure 9B:
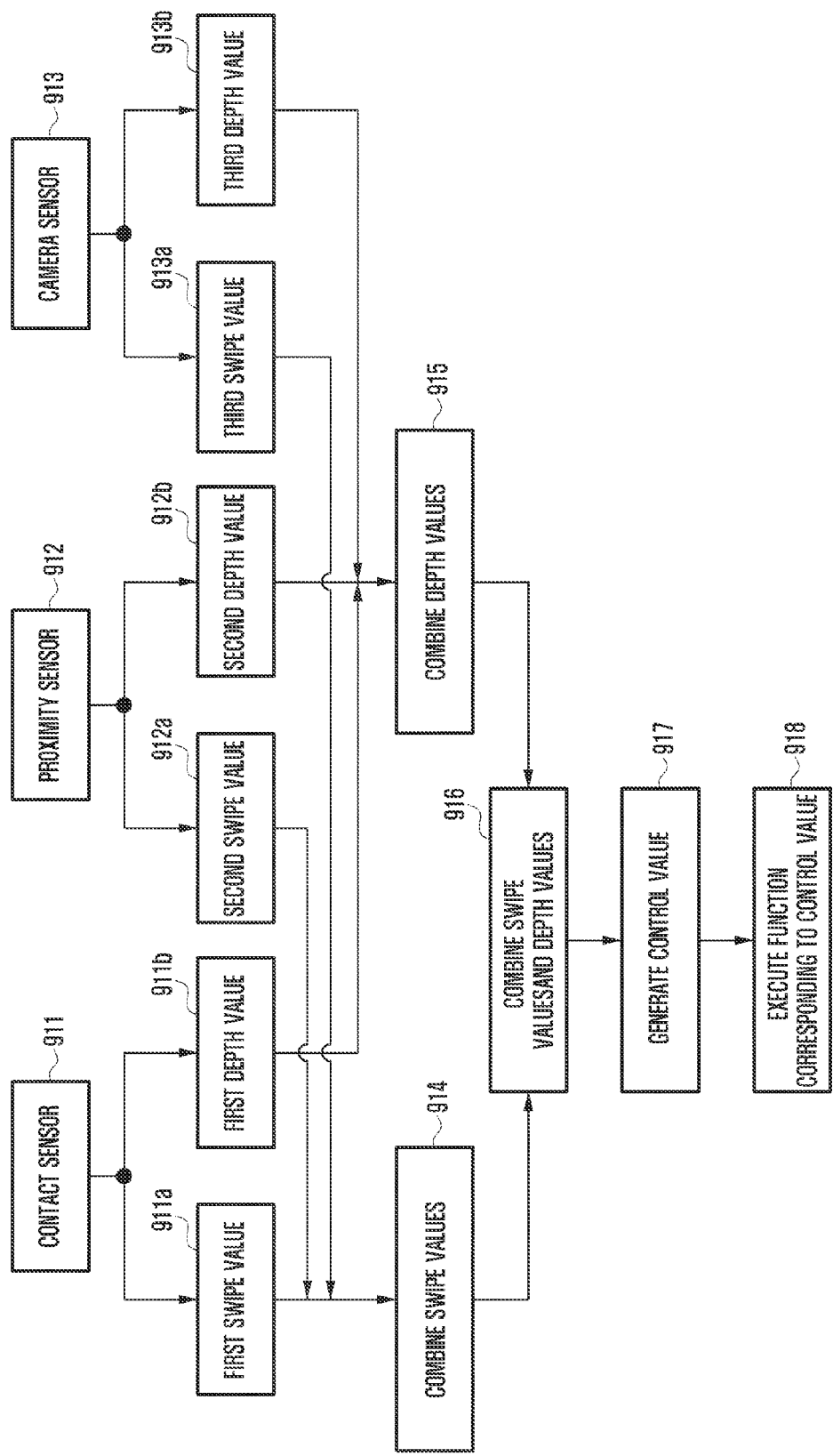

FIGS. 9A and 9B are diagrams illustrating an example of generating a control value by combining the same type of sensor values and a different type of sensor values according to an embodiment of the present disclosure.

Referring to FIG. 9A, at operation 903 and operation 904, the gesture recognition apparatus may recognize a first depth value and a first pointer value by using a first sensor 901.

At operation 905 and operation 906, the gesture recognition apparatus may recognize a second depth value and a second swipe value by using a second sensor 902.

At operation 907, the gesture recognition apparatus may generate a first combination value by combining the absolute values of the first depth value and the second depth value by using a weighting technique or a filter technique At operation 908, the gesture recognition apparatus may generate a second combination value by combining the first pointer value and the second swipe value. For example, the gesture recognition apparatus may update the first pointer value, update the second swipe value, and may generate a second combination value by combining the updated first pointer value and the updated second swipe value.

At operation 909, the gesture recognition apparatus may generate a control value by combining the first combination value and the second combination value.

Referring to FIG. 9B, at operation 911*a* and operation 911*b*, the gesture recognition apparatus may recognize the first swipe value and the first depth value by using a contact sensor 911. At operation 912*a* and operation 912*b*, the gesture recognition apparatus may recognize the second swipe value and the second depth value by using a proximity sensor 912. At operation 913*a* and operation 913*b*, the gesture recognition apparatus may recognize the third swipe value and the third depth value by using a camera sensor 913. For reference, the swipe value recognized by the contact sensor 911 and the proximity sensor 912 may have an absolute value, and the swipe value recognized by the camera sensor 913 and the dynamic vision sensor may have a relative value.

At operation 914, the gesture recognition apparatus may generate a first combination value by combining the first swipe value to the third swipe value. For example, the gesture recognition apparatus may combine the absolute values of the first swipe value and the second swipe value by using a weighting technique or a filter technique, may map the absolute value of the second swipe value to the relative value of the third swipe value, and may map the absolute value of the first swipe value to the relative value of the third swipe value, so that the first combination value may be generated.

At operation 915, the gesture recognition apparatus may generate a second combination value by combining the first depth value to the third depth value.

At operation 916, the gesture recognition apparatus may combine the first combination value and the second combination value. The gesture recognition apparatus may update the first combination value, update the second combination value, and may combine the updated first combination value and the updated second combination value.

At operation 917, the gesture recognition apparatus may generate a control value by using the output of operation 916.

At operation 918, the gesture recognition apparatus may execute a function corresponding to the control value.

Figure 10:
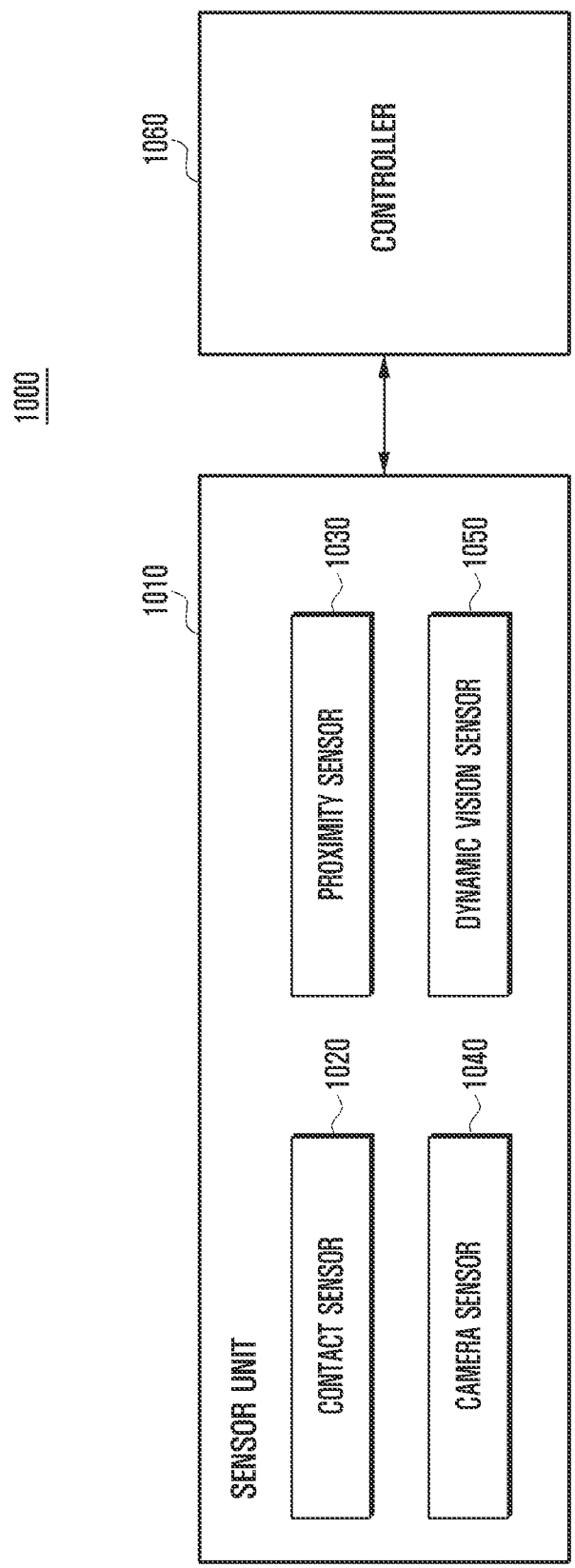
FIG. 10 is a block diagram illustrating a configuration of a gesture recognition apparatus by using a sensor according to an embodiment of the present disclosure.

FIG. 10 is a block diagram illustrating a configuration of a gesture recognition apparatus by using a sensor according to an embodiment of the present disclosure.

Referring to FIG. 10, a gesture recognition apparatus 1000 may include a sensor unit 1010 and a controller 1060.

According to an embodiment of the present disclosure, the sensor unit 1010 may include at least one of a contact sensor 1020, a proximity sensor 1030, a camera sensor 1040, or a dynamic vision sensor 1050, but is not limited thereto. The controller 1060 may determine a mounting position of at least one of the contact sensor 1020, the proximity sensor 1030, the camera sensor 1040, or the dynamic vision sensor 1050 in consideration of operational range of the sensor.

The sensor unit 1010 may recognize sensor values for an object uninterruptedly. For example, the sensor unit 1010 may recognize at least one of a depth value for the object, a pointer value for the object, or a swipe value for the object by using the sensor value (see FIGS. 2 to 5). The sensor unit 1010 may recognize the swipe value according to a motion of the object or a speed of the object for a certain time. The sensor unit 1010 may enable the contact sensor 1020, the proximity sensor 1030, the camera sensor 1040, and the dynamic vision sensor 1050 to uninterruptedly recognize the motion of the object according to the change of the depth value for the object.

The controller 1060 may generate a control value by combining the sensor values, and may execute a function corresponding to the control value. The controller 1060 may previously set a function corresponding to the control value, and may store a function for each control value in the storage unit (not shown). For example, the controller 1060 may set "DMB" for the first control value, set "screen magnification" for the second control value, and set "screen reduction" for the third control value.

According to an embodiment of the present disclosure, the controller 1060 may generate a control value by combining an absolute value of each sensor value or a relative value of each sensor value in consideration of the operational range of each sensor, when the types of the sensor values are identical. For example, the sensor value recognized in the contact sensor and the proximity sensor may have an absolute value, and the sensor value recognized in the camera sensor and the dynamic vision sensor may have a relative value.

According to another embodiment of the present disclosure, the controller 1060 may generate a control value by updating the sensor values, and combining the updated sensor values, when the types of the sensor values are different.

According to another embodiment of the present disclosure, the controller 1060 may generate a first combination value by combining the absolute value of each sensor or the relative value of each sensor in consideration of the operational range of each sensor, with respect to the same type of sensor values. Further, the controller 1060 may generate a second combination value by updating the sensor values and combining the updated sensor values, with respect to the different type of sensor values, and may generate a control value by combining the first combination value and the second combination value.

According to an embodiment of the present disclosure, a gesture of an object may be recognized uninterruptedly in a plurality of sensors having a different operational range.

It will be appreciated that various embodiments of the present disclosure according to the claims and description in the specification may be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape and the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method for recognizing a gesture by using a sensor, the method comprising:
   recognizing a plurality of sensor values for a hand gesture in a plurality of sensors having a different operational range;
   determining a depth level indicating a distance between a hand and a surface of an apparatus based on the sensor values;
   generating a control value by combining the sensor values; and
   executing a function corresponding to the control value and the depth level in response to the recognized hand gesture,
   wherein recognizing sensor values for the hand gesture comprises:
      recognizing a form of the hand using a first sensor among the plurality of sensors,
      determining the depth level of the recognized hand using a second sensor among the plurality of sensors, and
      determining a movement of the recognized hand using a third sensor among the plurality of sensors, and
   wherein the generating of the control value comprises:
      generating a first combination value by combining one of an absolute value of each sensor of the plurality of sensors and a relative value of each sensor of the plurality of sensors, with respect to a same type of the sensor values,
      generating a second combination value by updating the sensor values and combining the updated sensor values with respect to a different type of the sensor values, and
      generating the control value by combining the first combination value and the second combination value.

2. The method of claim 1, wherein the recognizing of the sensor values for the hand gesture comprises determining whether or not to activate at least one of a contact sensor, a proximity sensor, a camera sensor, and a dynamic vision sensor in consideration of an operational range of the sensor.

3. The method of claim 1,
   wherein the recognizing of the sensor values for the hand gesture comprises recognizing a depth value for the hand by using a sensor value, and
   wherein the determining of the depth level is performed based on the sensor value.

4. The method of claim 1, wherein the recognizing of the sensor values for the hand gesture comprises recognizing a pointer value of the hand.

5. The method of claim 1, wherein the recognizing of the sensor values for the hand gesture comprises recognizing a swipe value of the hand.

6. The method of claim 5, wherein the recognizing of the sensor values for the hand gesture comprises recognizing the swipe value according to one of a motion of the hand and a speed of the hand.

7. The method of claim 1, wherein the generating of the control value comprises generating the control value by combining one of an absolute value of each sensor value and a relative value of each sensor value, when types of the sensor values are identical.

8. The method of claim 1, wherein the generating of the control value comprises:
   updating the sensor values, when types of the sensor values are different; and
   generating the control value by combining the updated sensor values.

9. An apparatus for recognizing a gesture by using a sensor, the apparatus comprising:
   a plurality of sensors configured to recognize sensor values for a hand gesture in a plurality of sensors having a different operational range; and
   at least one processor configured to:
      determine a depth level indicating a distance between a hand and a surface of an apparatus based on the sensor values, generate a first combination value by combining one of an absolute value of each sensor of the plurality of sensors and a relative value of each sensor of the plurality of sensors, with respect to a same type of the sensor values, generate a second combination value by updating the sensor values and combine the updated sensor values, with respect to a different type of the sensor values, and generate the control value by combining the first combination value and the second combination value, and execute a function corresponding to the control value and the depth level, wherein the at least one processor is further configured to:

recognize a form of the hand using a first sensor among the plurality of sensors, determine the depth level using a second sensor among the plurality of sensors, and determine a movement of the recognized hand using a third sensor among the plurality of sensors.

10. The apparatus of claim 9, wherein the at least one processor is further configured to determine whether or not to activate at least one of a contact sensor, a proximity sensor, a camera sensor, and a dynamic vision sensor in consideration of an operational range of the sensor.

11. The apparatus of claim 9, wherein the sensor is further configured to recognize a depth value for the hand.

12. The apparatus of claim 9, wherein the sensor is further configured to recognize a pointer value for the hand.

13. The apparatus of claim 9, wherein the sensor is further configured to recognize a swipe value for the hand.

14. The apparatus of claim 13, wherein the sensor is further configured to recognize the swipe value according to one of a motion of the hand and a speed of the hand.

15. The apparatus of claim 9, wherein the at least one processor is further configured to generate the control value by combining one of an absolute value of each sensor value and a relative value of each sensor value, when types of the sensor values are identical.

16. The apparatus of claim 9, wherein the at least one processor is further configured to:

update the sensor values, when types of the sensor values are different, and generate the control value by combining the updated sensor values.

* * * * *